United States Patent [19]

Watts

[11] 4,370,792

[45] Feb. 1, 1983

[54] METHOD OF COVERING SURFACES WITH TENSILE SHEET MATERIALS

[76] Inventor: Warren G. Watts, 1 Little La., Westport, Conn. 06880

[21] Appl. No.: 291,411

[22] Filed: Aug. 10, 1981

[51] Int. Cl.[3] .............................................. B23Q 17/00

[52] U.S. Cl. ......................................... 29/407; 29/448; 29/451; 29/235; 24/201 C; 24/243 K; 160/392

[58] Field of Search ................. 29/448, 449, 450, 451, 29/453, 235, 452, 407; 160/392, 378; 24/201 C, 243 K

[56] References Cited

U.S. PATENT DOCUMENTS

| | | | |
|---|---|---|---|
| 1,774,190 | 8/1930 | Stannard | 24/243 K UX |
| 2,638,131 | 5/1953 | Rohs | 29/451 UX |
| 2,797,750 | 7/1957 | Van Dette | 160/392 |
| 2,950,727 | 8/1960 | Dunn | 24/243 K X |
| 3,068,939 | 12/1962 | Commisso | 160/392 |
| 3,187,801 | 6/1965 | Saling | 160/392 |
| 3,371,702 | 3/1968 | Keegan et al. | 160/392 |
| 3,505,725 | 4/1970 | Curry | 29/451 |
| 3,928,897 | 12/1975 | Tombu | 24/243 K |
| 4,316,308 | 2/1982 | Chatelain | 160/392 X |

FOREIGN PATENT DOCUMENTS

| | | | |
|---|---|---|---|
| 1207775 | 12/1965 | Fed. Rep. of Germany | 24/243 K |
| 1165725 | 10/1969 | United Kingdom . | |

*Primary Examiner*—Charlie T. Moon

[57] ABSTRACT

A device and method for holding tensile sheet materials to cover surfaces is disclosed. The device comprises a pair of parallel tracks adapted to be mounted on the surface to be covered with each track having at least one longitudinal slot. The slot has a pair of confronting side walls which are ridged. An elastic spline is inserted into the slot over the sheet material. The spline and ridged slots frictionally hold the sheet material in tension.

12 Claims, 12 Drawing Figures

METHOD OF COVERING SURFACES WITH TENSILE SHEET MATERIALS

BACKGROUND OF THE INVENTION

The present invention relates to a frame to which a tensile sheet material can be attached and a method of attaching the material, so that it will be taut with a flat appearance. The frame consists of tracks which are slotted with a plurality of parallel ridges in the slot.

It has become common practice to attach a tensile sheet material to a frame, which has been previously attached to a surface such as a wall or ceiling. This is done either for decorative purposes, as a paneled effect can be achieved, or to hide imperfections in the surface sought to be covered, or in an attempt to conserve energy as it can be an extra layer of insulation, or the material can cover a layer of insulation.

In the frames presently used, a male and female member hold the tensile sheet material in position by friction, with the male and female member being of substantially the same size and shape. Examples of this type of system are set forth in U.S. Pat. No. 3,068,939 and British Pat. No. 1,165,725.

However, the frames of the state of the art have a major disadvantage in that as the tensile sheet material is being attached to the frame ripples, waves or other visually unacceptable features can occur due to the inherent stretch of the tensile sheet material. As the depth of the female member of these frames is only equal to the depth of the male member, there has been no practical way to adjust the tensile sheet material between the frame, so that is is progressively and uniformly tightened so that it becomes completely taut.

SUMMARY OF THE INVENTION

The disadvantages set forth above are eliminated by the frame of the present invention, which consists of tracks which have longitudinal slots with a plurality of parallel longitudinal ridges in the slots. Besides permitting the tensile sheet material to be installed so that it is taut, giving a flat appearance, the material can be removed from the frame, permitting access to the underlying surface. Also, the frame puts no restriction on the type of material which can be used. The only restrictions will be those of esthetics and the flammability of the material.

The invention consists of using tracks, made of a suitable material such as aluminum or plastic, which have one or more but preferably two longitudinal rectilineraly shaped slots, with a plurality of parallel longitudinal ridges along the side walls of the slot. The tensile sheet material is attached to the track by a compressible spline in a three-step procedure, with the depth of the slot being approximately two-and-one-half times the diameter of the spline.

After the tracks have been attached to the surface which is to be covered, with the distance between the tracks a little less than the width of the material, one edge of the material and a spline are inserted into a slot by a special tool, so that the spline is level with the face of the track. The material and spline are then set halfway to the bottom of the slot with a special tool. Finally, the spline and material are set all the way to the bottom with a special tool. Each step is done first to one edge of the material and then repeated with the opposite edge before proceeding on the next step. This results in the material being completely stretched between the tracks of the frame. Also, due to the depth of the slot, the spline is not visible when set to the bottom of the slot. The excess material is then trimmed.

In one embodiment, a strip of material of the same type already positioned on the frame is attached to the material and the spline in each slot of the track and to the face of the track, so that only an unbroken stretch of material is seen, with neither the edges of the material in the slot, the spline, nor the face of the track visible. This gives a welted appearance.

To cover the portion of the track, which forms the outer perimeter of the frame, a strip of material is attached between the track and surface sought to be covered. This strip of material then hangs loosely from the frame. After the area between the tracks has been covered by the material, using the procedure set forth, the strip of material hanging loosely is set to the bottom of the outermost slot by the special tool. The strip of material is then attached to the face of the track by using the special tool to set it in the adjacent parallel slot. It attaches itself by virtue of the fact that the uncovered slot and face of the track are covered with a layer of adhesive material which adheres to the strip of material, the surface of the slot and the material in the slot. The excess material is then trimmed and only an unbroken stretch of material is visible.

In a second embodiment, after the excess material has been trimmed, a second spline is placed in the slot, so that the trimmed material is not visible.

BRIEF DESCRIPTION OF THE DRAWINGS

Further features and advantages of the invention become clear from the following description and drawings.

PREFERRED EMBODIMENT

Figure 1:
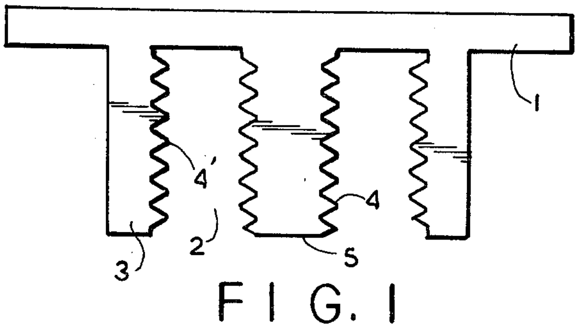
FIG. 1 is an end view of the track used to make the frame.
Figure 2:
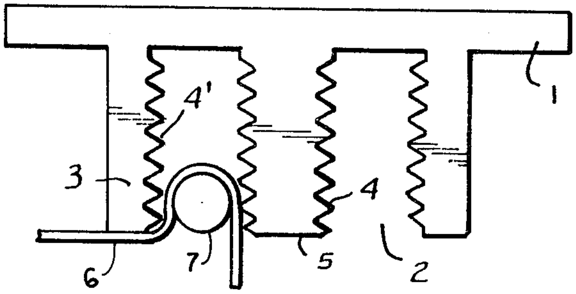
FIG. 2 is an end view of a track with a spline in a slot of the track, flush with the face of the track, holding a piece of material.

Referring now to the drawings, the track 1, which is used for the frame (not illustrated), and which is preferably made from a light weight material such as extruded aluminum or plastic, has two rectilinear longitudinal slots 2. Each side wall 3 of the slot 2 has a plurality of parallel longitudinal ridges 4. The depth of the slot 2 is approximately two and one half times the distance between the innermost edges 4' of the ridges 4 of the opposing side walls 3.

After the tracks 1 have been attached to the surface to be covered, generally in a rectangular configuration, the material 6 is cut to a width slightly greater than that separating the tracks 1 to which it is to be attached. A line is marked on the material 6, near the edge 13 of the material 6 and parallel to the edge 13. The midpoint of the longitudinal extent of the described line is aligned with the midpoint of the longitudinal extent of the slot 2 and attached to the slot 2 by a spline 7.

The spline 7, preferably made of plastic tubular material is compressible and has a cricular cross section. The diameter of the spline 7 is such that the depth of the slot 2 is approximately two and one half ($2\frac{1}{2}$) times greater than the diameter. Such splines are, for example, manufactured by the Ansan Manufacturing Co. under No. SRB 130.

Figure 11:
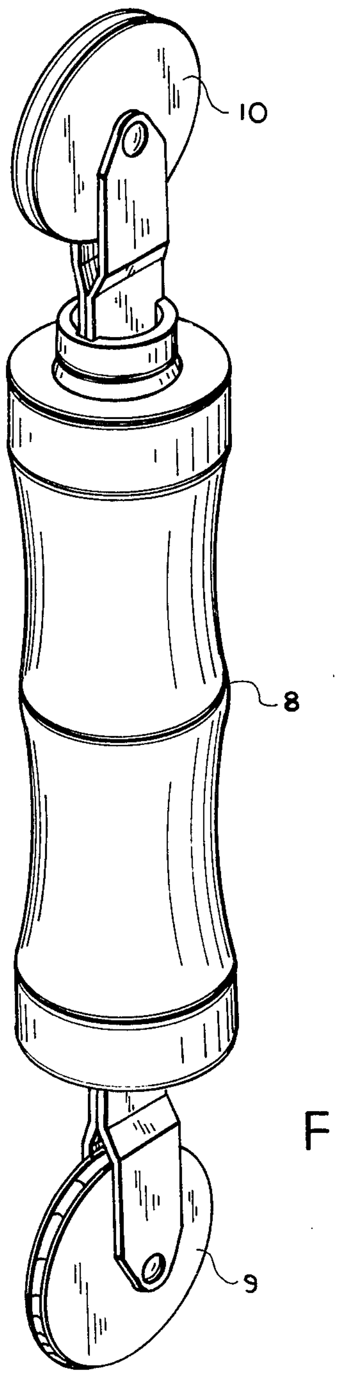
FIG. 11 is a perspective view of the special tool used to set the spline in the track over the material.

After the midpoint has been aligned and attached, the edge 13 of the material 6 on which the line has been drawn is attached manually or by means of a special tool 8 to the track 1 by the spline 7 at predetermined intervals, to facilitate further instalation. Then starting at the midpoint and working toward one end of the track 1, the line drawn on the material 6 is aligned with the centerline of the slot 2, and the spline 7 is rolled into the slot 2 over the line using a concave wheel 9 of the special tool 8. The special tool 8 which is shown in FIG. 11 is of the type used to set splines in window screens. When the spline 7 is set in the slot 2 by the concave wheel 9, it is set flush with a face 5 of the track 1. After the end of the track 1 is reached, the process is then repeated commencing at the midpoint and working to the other end of the track. The spline 7 is then positioned as is shown in FIG. 6.

Figure 7:
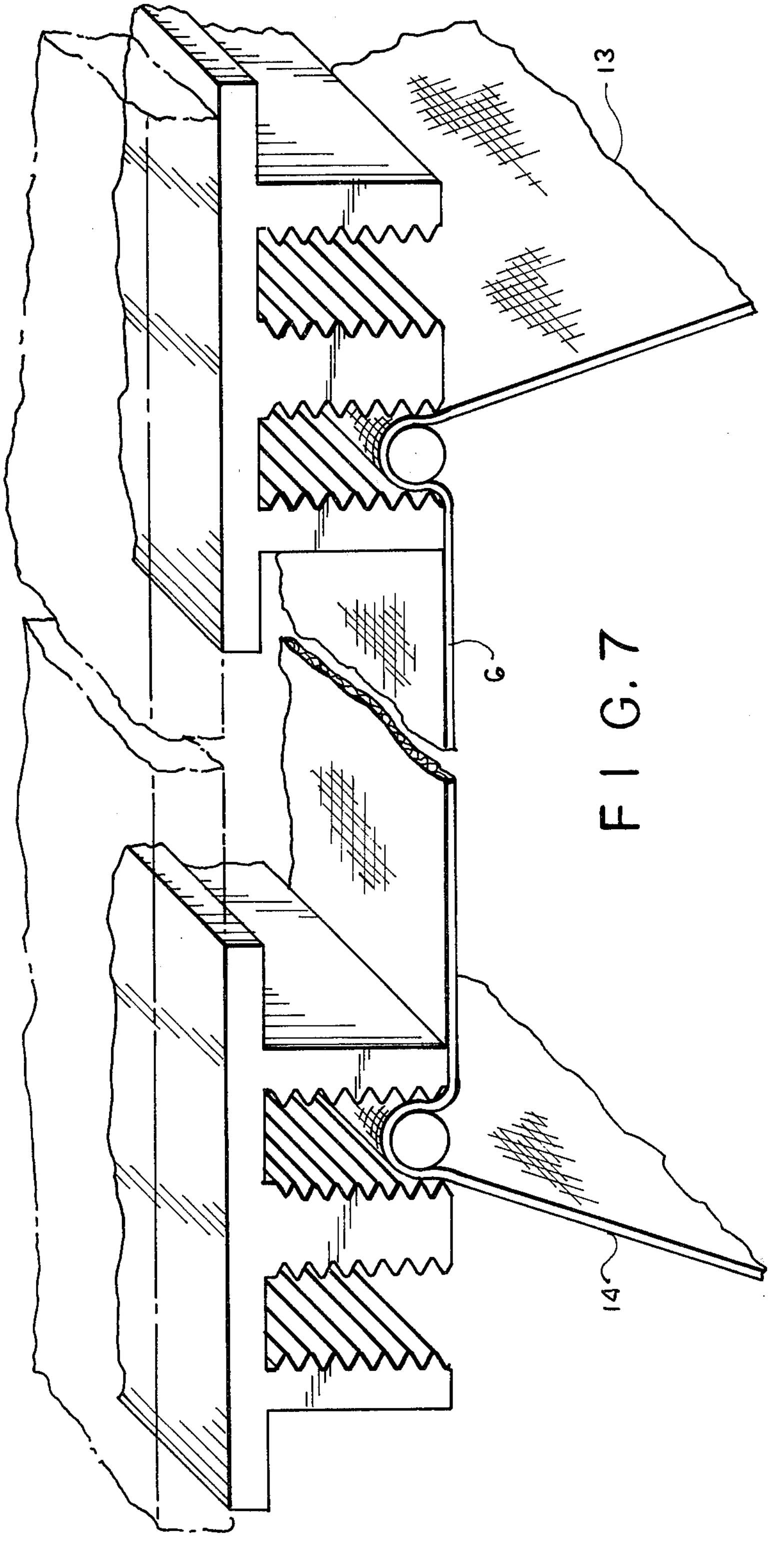
FIG. 7 is a perspective view showing the completed first step of attaching the other edge of the material to the frame.

The midpoint of the opposing edge 14 of the longitudinal extent of the material 6 is then aligned with the midpoint of the longitudinal extent of the slot 2 of the track 1 to which it is to be attached. After the midpoints have been aligned, the material 6 is pulled laterally, so that the material 6 at the midpoint of the longitudinal extent of the slot 2 is taut. The material 6 while held taut is then attached at the midpoint of the slot 2 with a spline 7 manually or by means of the special tool 8. The second edge is then attached to the track 1 in the same manner as was the first edge. The material 6 then appears as shown in FIG. 7.

Figure 3:
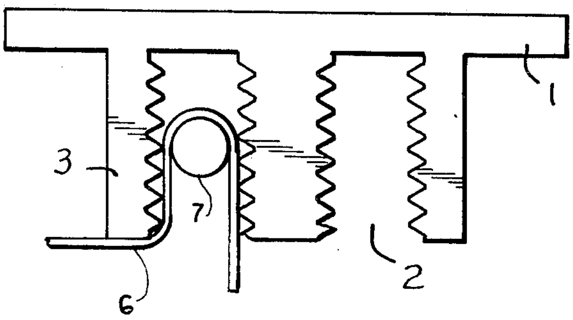
FIG. 3 is an end view of a track with a spline in a slot which has been moved halfway to the bottom, holding a piece of material.
Figure 6:
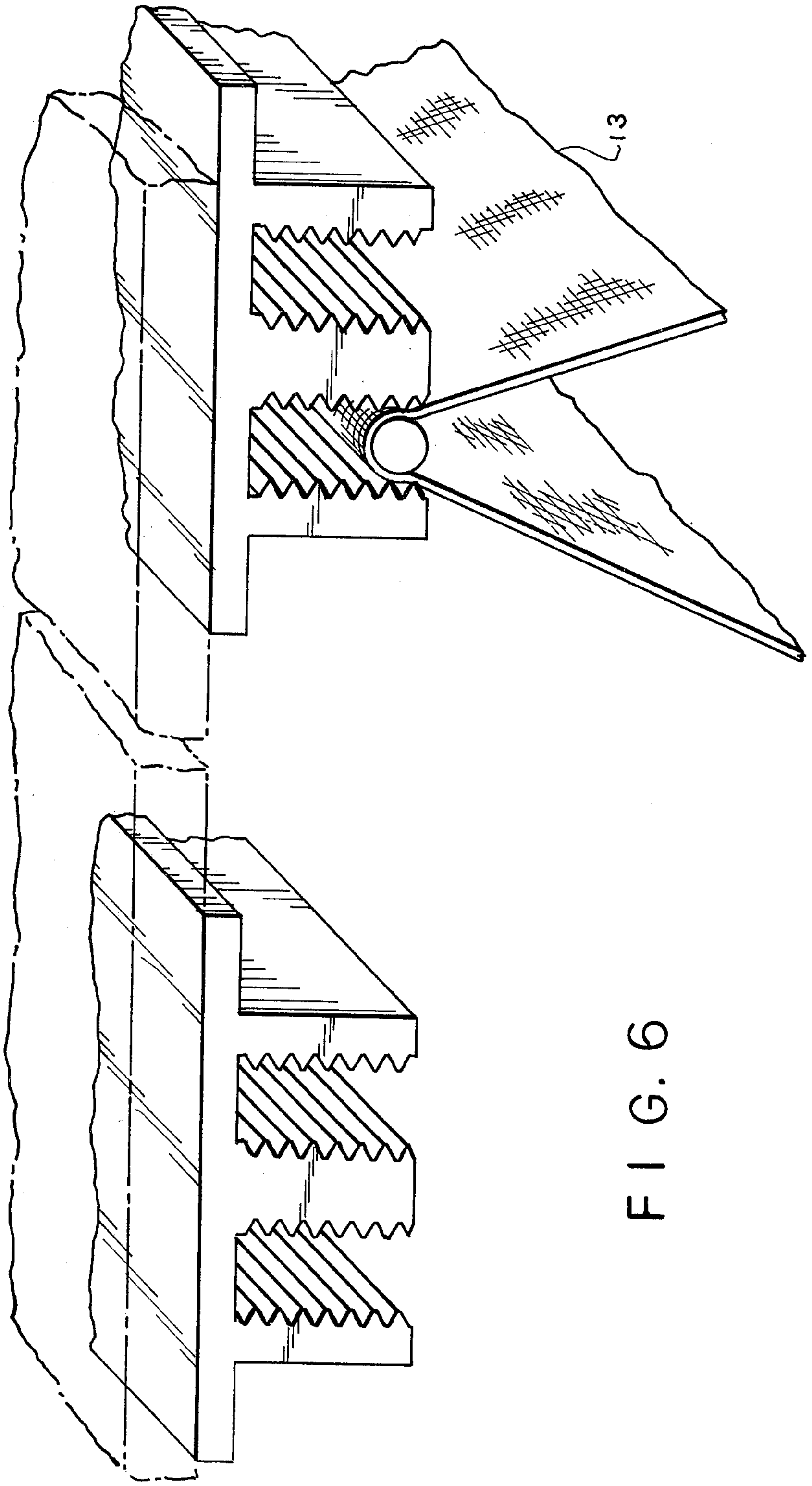
FIG. 6 is a perspective view showing the completed first step of attaching one edge of the material to a track of the frame.

Then beginning at the midpoint of the longitudinal extent of the edge 13 of the material 6 which was first attached to the track 1, as shown in FIG. 6, and working toward one end of the track 1, the spline 8 is set to one half the depth of the slot 2 by using a convex wheel 10 of the special tool 8, so that it appears as shown in FIG. 3. This step is then repeated for the other half of the track 1 and then repeated in the same manner for the opposing edge 14.

Figure 4:
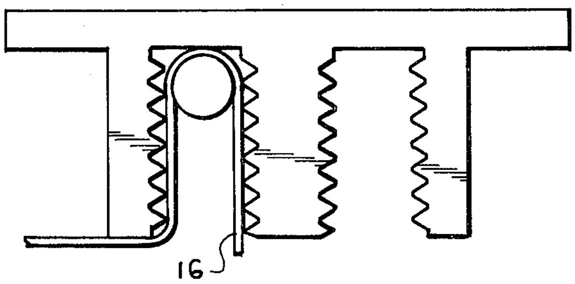
FIG. 4 is an end view of a track with a spline in a slot which has been moved all the way to the bottom of the slot, holding a piece of material.
Figure 5:
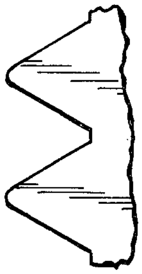
FIG. 5 is a section showing the ridges of the track in detail.

After the spline 7 has been set half way to the bottom of the slots 2 in both tracks 1 the procedure is repeated commencing with edge 13, but with the spline 7 now being set all the way to the bottom of the slot 2 by the convex wheel 10 of the special tool 8, so that it appears as shown in FIG. 4. The material 6 is now held taut between the tracks 1 and has a flat appearance. The portion 16 of the material 6 which is excess and hangs loosely from the tracks 1 can be cut off by running a knife or similar cutting instrument along the ridge 4 nearest the face 5.

A double stick tape 11' is then attached to the face 5 of the track 1, which has material 6 and spline 7 in each slot 2. The covering on the tape 11' is removed and the tape 11' is then rolled into the slots 2, so that it adheres to the side walls 3, either by a second special tool 12 or by the convex wheel 10 of the first special tool 8. The tape 11' will be attached to the face 5 and side walls 3 as shown in FIG. 9.

Figure 10:
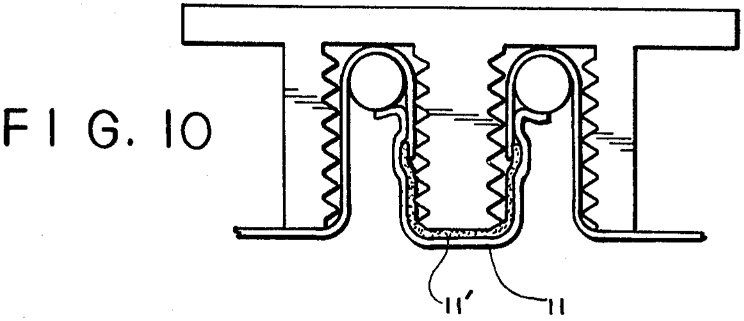
FIG. 10 is an end view showing the strip of material attached to the face of the track and to the spline and material in the slots by means of the adhesive tape.
Figure 9:
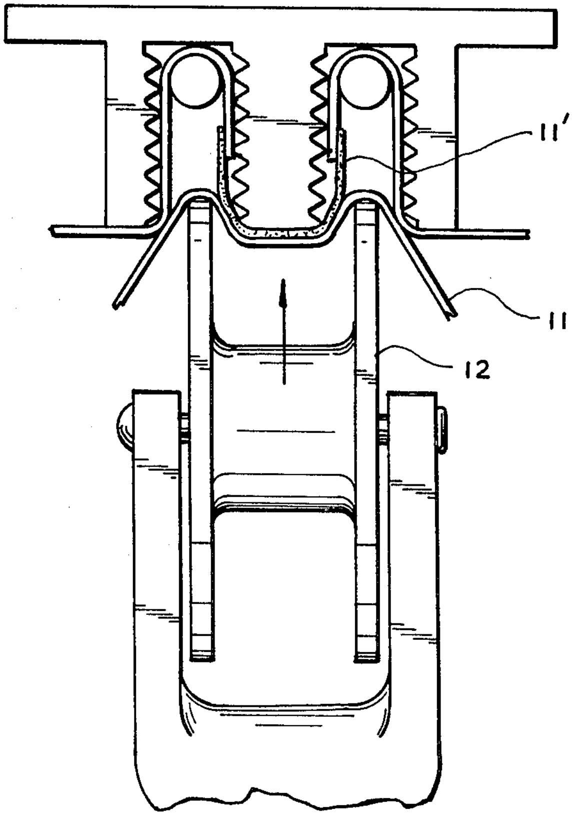
FIG. 9 is an end view showing a strip of material being attached to the face of the track by means of a special tool over adhesive applied to the face of the track.

As shown in FIG. 9, a first strip of material 11, which has been precut to the appropriate width is then applied over the double stick tape 11'. This strip of material 11 is then rolled into the slots 2 by the convex wheel 10 of tool 8 or a second special tool 12, which can be made from a pulley wheel or the like. This results in the first strip of material 11 becoming attached to the face 5, the splines 7 and the material 6 as shown in FIG. 10. After trimming the excess with a knife, this gives a welted appearance to the assembly.

Figure 12:
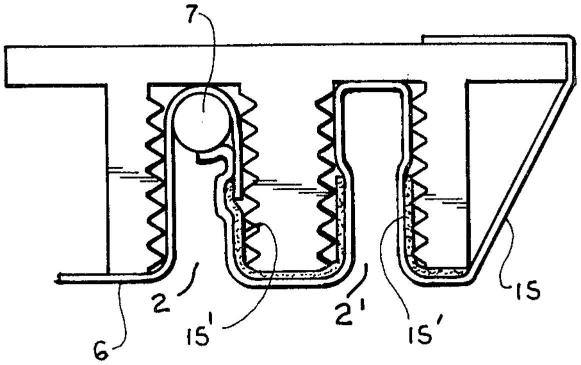
FIG. 12 is an end view of an outer track of the frame showing how the track appears after it is completely covered by a second strip of material applied over the adhesive tape.

As shown in FIG. 12, the track 1 which makes up the outer perimeter of the frame can also be covered by a second strip of material 15, so that no portion of the track 1 is visible. As the track 1 is being attached to the surface to be covered, the second strip of material 15, which has been precut to an appropriate width, is positioned between the surface and the track 1. The second strip of material 15 is then positioned, so that it hangs loosely. Then after the complete procedure of attaching the material 6 to the track 1 has been completed, an adhesive strip 15', such as a conventional double stick tape having a removable backing is attached to the face 5 of the track 1, so that it also covers the outer slot 2' of the track 1. After the covering on the double stick tape 15' has been removed, the double stick tape 15' covering the outer slot 2' is then cut by a knife. The double stick tape 15' is then inserted into the outer slot 2' by the convex wheel 10 of the first special tool, so that it adheres to both side walls 3 of the outer slot 2'. Also, the double stick tape 15' is inserted into the other slot 2, with the tape 15' only being on the side wall adjacent to the outer slot 2'. The double stick tape 15' will then appear as shown in FIG. 12. The strip of material 15 is then set to the bottom of the outer slot 2', by means of wheel 10, brought across the face 5 and set into the slot having the material 6 and spline 7. The excess material is then trimmed with a knife or similar item. After this step is finished no portion of the track 1 is visible.

Figure 8:
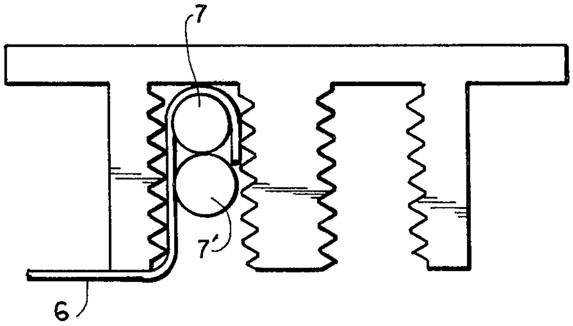
FIG. 8 is an end view of a track with the material attached to the track by means of two splines in the slot of the track.

In another embodiment, shown in FIG. 8, after the excess material has been trimmed, a second spline 7' is put over the first spline 7 by the special tool 8.

Although the invention is illustrated and described with reference to a plurality of embodiments thereof, it is to be expressly understood that it is in no way limited to the disclosure of such preferred embodiments, but is capable of numerous modifications within the scope of the appended claims.

I claim:

1. A method for covering a surface with a tensile sheet material comprising the steps of:

(a) attaching a frame to the surface to be covered, with the frame being made of tracks having at least one longitudinal slot with a pair of confronting side walls which are ridged, (b) cutting the material to a width slightly greater than the distance separating the tracks plus twice the depth of a slot, (c) inserting one edge of the material and an elastic spline over the material into a slot, whereby the spline is substantially flush with a face of the track, (d) inserting the opposite edge of the material into a slot of the opposite track with an elastic spline over the material whereby the spline is substantially flush with the face of the track, (e) setting the spline and material halfway to the bottom of the slot for one edge and then repeating it for the other edge, and (f) setting the spline and material all the way to the bottom of the slot for one edge and then repeating it for the other edge, whereby the material is stretched completely taut between the tracks.

2. A method for covering a surface with a tensile sheet material as claimed in claim 1, wherein the longitudinal slots of the tracks are rectilinear.

3. A method for covering a surface with a tensile sheet material as claimed in claim 2, wherein each track has two parallel slots.

4. A method for covering a surface with a tensile sheet material as claimed in claim 3, wherein the depth of the slot is approximately two and one-half ($2\frac{1}{2}$) times greater than the distance between the ridges on the confronting side walls.

5. A method for covering a surface with a tensile sheet material as claimed in claim 1, wherein a tool having a concave wheel is used to insert the material and spline in the slot until the spline is substantially flush with the face of the track and a tool having a convex wheel is used to insert the material and spline both halfway to the bottom and all the way to the bottom of the slot.

6. A method for covering a surface with a tensile sheet material as claimed in claim 1, further comprising (a) trimming the excess material after it has been set to the bottom of the slot, and (b) inserting a second elastic spline in the slot, whereby the second spline rests on the first spline.

7. A method for covering a surface with a tensile sheet material comprising the steps of:

(a) attaching a frame to the surface to be covered, with the frame being made of tracks having at least one longitudinal slot with a pair of confronting side walls which are ridged, (b) cutting the material to a width slightly greater than the distance separating the tracks plus twice the depth of a slot, (c) marking a line on the material near and parallel to an edge thereof, (d) aligning the line with a first slot of a track and inserting an elastic spline over the line into the slot whereby the spline is substantially flush with the face of the track, (e) aligning the midpoint of a second edge, which is opposite of the first edge inserted in the slot, with the midpoint of a second slot which is opposite of the first slot into which the material has already been inserted, (f) pulling the material aligned with the midpoint laterally until it is taut, (g) inserting a spline over the material into the slot whereby the spline is substantially flush with the face of the track, (h) setting the spline and material halfway to the bottom of the slot for one edge and then repeating it for the other edge, and (i) setting the spline and material all the way to the bottom of the slot for one edge and then repeating it for the other edge, whereby the material is stretched completely taut between the tracks.

8. A method for covering a surface with a tensile sheet material as claimed in claim 7, wherein the longitudinal slots of the tracks are rectilinear.

9. A method for covering a surface with a tensile sheet material as claimed in claim 8, wherein each track has two parallel slots.

10. A method for covering a surface with a tensile sheet material as claimed in claim 9, wherein the depth of the slot is approximately two and one-half ($2\frac{1}{2}$) times greater than the distance between the ridges of the confronting side walls.

11. A method for covering a surface with a tensile sheet material as claimed in claim 7, wherein a tool having a concave wheel is used to insert the material and spline in the slot until the spline is substantially flush with the face of the track and a tool having a convex wheel is used to insert the material and spline both halfway to the bottom and all the way to the bottom of the slot.

12. A method for covering a surface with a tensile sheet material as claimed in claim 7, further comprising (a) trimming the excess material after it has been set to the bottom of the slot, and (b) inserting a second elastic spline in the slot, whereby the second spline rests on the first spline.

* * * * *